US011671480B2

(12) United States Patent
Jeuk et al.

(10) Patent No.: US 11,671,480 B2
(45) Date of Patent: Jun. 6, 2023

(54) NETWORK TOPOLOGY MODEL GENERATION AND DEPLOYMENT FOR MACHINE LEARNING SYSTEMS

(71) Applicant: Cisco Technology, Inc., San Jose, CA (US)

(72) Inventors: Sebastian Jeuk, Munich (DE); Sridar Kandaswamy, San Jose, CA (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/390,527

(22) Filed: Jul. 30, 2021

(65) Prior Publication Data

US 2023/0032585 A1    Feb. 2, 2023

(51) Int. Cl.
*H04L 67/10* (2022.01)
*G06N 20/00* (2019.01)
*H04L 41/0893* (2022.01)
*H04L 41/5041* (2022.01)

(52) U.S. Cl.
CPC .............. *H04L 67/10* (2013.01); *G06N 20/00* (2019.01); *H04L 41/0893* (2013.01); *H04L 41/5041* (2013.01)

(58) Field of Classification Search
CPC . H04L 67/10; H04L 41/0893; H04L 41/5041; H04L 41/08; H04L 41/0806; H04L 41/5054; G06N 20/00
See application file for complete search history.

(56) References Cited

U.S. PATENT DOCUMENTS

| | | | |
|---|---|---|---|
| 9,503,359 B2 * | 11/2016 | Dasgupta | H04L 41/18 |
| 10,992,540 B1 * | 4/2021 | Kandaswamy | H04L 41/12 |
| 11,398,948 B2 * | 7/2022 | Jeuk | H04L 41/0813 |
| 2016/0359680 A1 * | 12/2016 | Parandehgheibi | G06F 16/174 |
| 2017/0192825 A1 | 7/2017 | Biberman et al. | |
| 2017/0213156 A1 * | 7/2017 | Hammond | G06F 8/437 |
| 2017/0279827 A1 * | 9/2017 | Savalle | H04L 67/02 |
| 2018/0373986 A1 * | 12/2018 | Rainwater | G06N 3/084 |
| 2019/0026085 A1 | 1/2019 | Bijani et al. | |
| 2019/0102700 A1 | 4/2019 | Babu et al. | |
| 2019/0173940 A1 | 6/2019 | Bagarolo et al. | |
| 2020/0084112 A1 | 3/2020 | Kandaswamy et al. | |
| 2020/0409780 A1 * | 12/2020 | Balasubramanian | G06F 9/547 |

(Continued)

*Primary Examiner* — Michael Won
(74) *Attorney, Agent, or Firm* — Lee & Hayes, P.C.

(57) ABSTRACT

Techniques are described herein for generating and deploying network topologies to implement machine learning systems. A topology deployment system may receive data representing a logical model corresponding to a machine learning system, and may analyze the machine learning system to determine various components and attributes of the machine learning system to be deployed. Based on the components and attributes of the machine learning system, the topology deployment system may select target resources and determine constraints for the deployment of the machine learning system. A corresponding network topology may be generated and deployed across one or a combination of workload resource domains. The topology deployment system also may monitor and update the deployed network topology, based on performance metrics of the machine learning system and/or the current status of the system in a machine learning pipeline.

20 Claims, 8 Drawing Sheets

(56) References Cited

U.S. PATENT DOCUMENTS

| | | | |
|---|---|---|---|
| 2021/0174257 A1* | 6/2021 | Pothula | G06F 16/27 |
| 2021/0258988 A1* | 8/2021 | Balakrishnan | G06N 3/088 |
| 2021/0286638 A1* | 9/2021 | Fan | H04L 43/0852 |
| 2021/0367849 A1* | 11/2021 | Kandaswamy | H04L 41/12 |
| 2021/0392049 A1* | 12/2021 | Jeuk | H04L 47/74 |
| 2022/0092465 A1* | 3/2022 | Moss | G06N 3/04 |
| 2022/0114495 A1* | 4/2022 | Nurvitadhi | G06N 3/063 |
| 2022/0239758 A1* | 7/2022 | Klein | H04L 67/10 |
| 2022/0254045 A1* | 8/2022 | Boardman | G06T 7/248 |
| 2022/0276618 A1* | 9/2022 | Aroskar | B60W 60/001 |

* cited by examiner

MAPPING OF MACHINE LEARNING SYSTEM ATTRIBUTES TO RESOURCES, CONSTRAINTS, AND/OR METADATA

| MACHINE LEARNING SYSTEM ATTRIBUTE | ATTRIBUTE VALUE | RESOURCES | CONSTRAINTS | METADATA |
|---|---|---|---|---|
| MACHINE LEARNING ALGORITHM | [AAA] | R1=(C1,N1,S1) | C1 | META1 |
| TEST DATA TYPE | [BBB] | R2=(C2,N2,S2) | C2 | META2 |
| FEATURE TYPE | [CCC] | R3=(C3,N3,S3) | C3 | META3 |
| TRAINING DATA AMOUNT | [DDD] | R4=(C4,N4,S4) | C4 | META4 |
| OFFLINE EVALUATION METRIC | [EEE] | R5=(C5,N5,S5) | C5 | META5 |
| ONLINE EVALUATION METRIC | [FFF] | R6=(C6,N6,S6) | C6 | META6 |
| MODEL PERFORMANCE REQUIREMENT | [GGG] | R7=(C7,N7,S7) | C7 | META7 |

FIG. 4

NETWORK TOPOLOGY MODEL GENERATION AND DEPLOYMENT FOR MACHINE LEARNING SYSTEMS

TECHNICAL FIELD

The present disclosure relates generally to generating and deploying computing and/or network topologies within workload resource domains to implement machine learning systems. In particular, the present disclosure relates to generating network topologies for machine learning systems based on particular components and/or attributes of the machine learning systems to be deployed, and monitoring and updating the deployed network topology based on the performance and/or current pipeline stage of the machine learning system.

BACKGROUND

Cloud computing involves using a network of servers hosted remotely on the Internet, rather than local servers or personal computers, to store, manage, and process data. Cloud computing networks for large-scale systems commonly may use deployment models, in which private clouds and/or on-premise infrastructures may be allocated for storing or processing private and secure data, while one or more public clouds may be used for storing or process other non-secure system data. Such computing environments, which may be referred to as multiple workload resource domain environments (or multi-pool environments) may include multi-cloud environments, hybrid cloud environments, multi-datacenter environments, multi-edge computing environments, and/or any combination thereof. Multiple workload resource domain environments may allow architectural flexibility and scalability with respect to processing demand, as well as allowing integration of specialized computational models.

When designing network topologies for deployment within a public cloud, private cloud, on-premise datacenter, or the like, a network topology model is generated based on a logical model and/or constraints provided by system administrators and/or tenants. However, for network topologies spanning multiple workload resource domain environments, generation, deployment, and maintenance of the topology may be complex and costly, due to the potential functional disparities between the different computing environments, dynamic system changes or errors that may occur within the computing environments after deployment of the topology, and splitting of system management responsibilities between the public cloud providers, private cloud providers, on-premise infrastructure administrators, etc.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 depicts an example table storing resource and constraint data associated with machine learning system attributes, in accordance with one or more implementations of the disclosure.

DESCRIPTION OF EXAMPLE EMBODIMENTS

Overview

Figure 1:
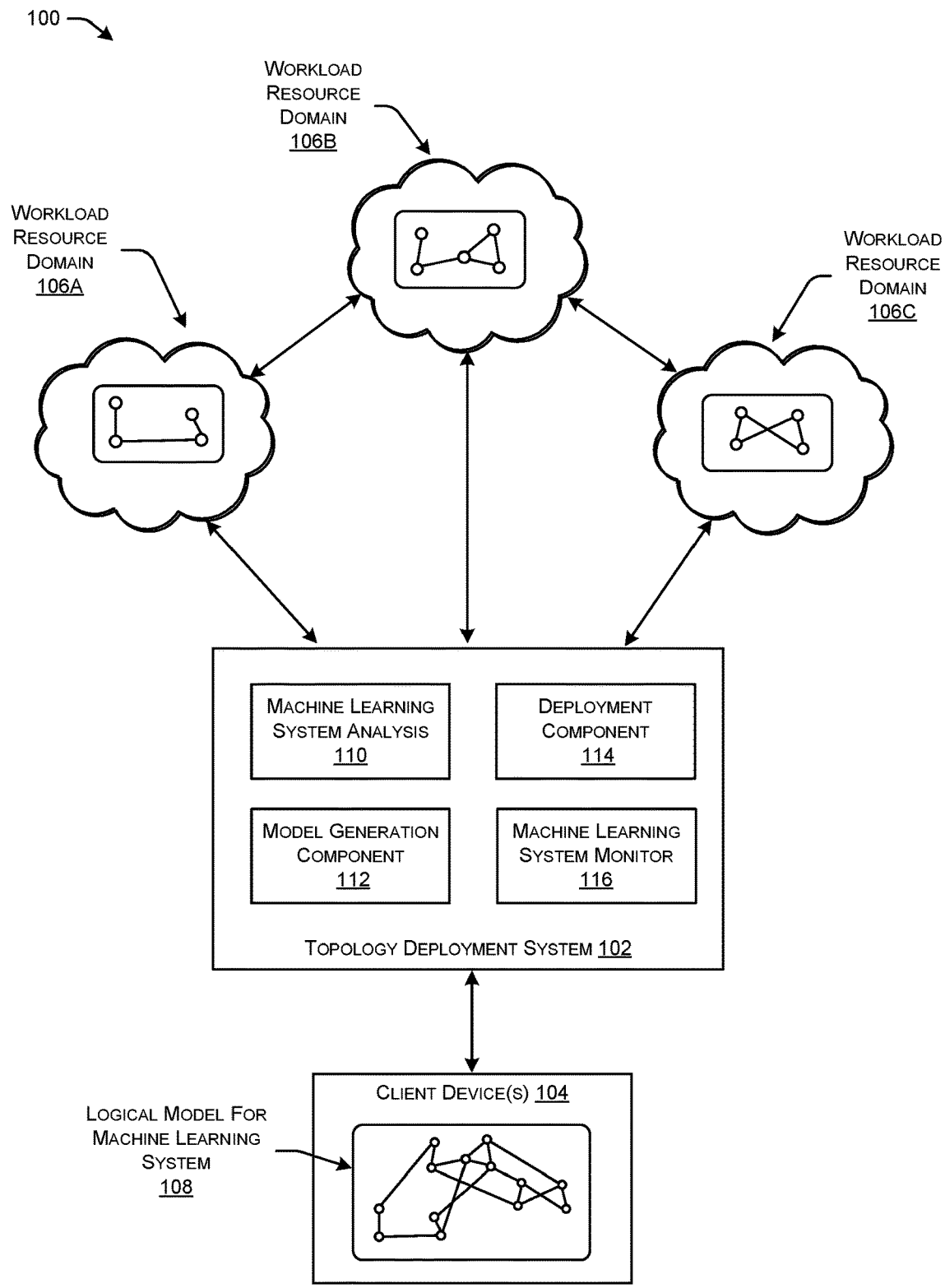
FIG. 1 depicts a computing environment including a topology deployment system configured to analyze and deploy a machine learning system as a network topology across multiple workload resource domains, in accordance with one or more implementations of the disclosure.

Techniques are described herein for generating and deploying network topologies to implement machine learning systems. In some examples, a topology deployment system may receive data representing a logical model for implementing a machine learning system. To deploy the machine learning system in a production environment, the topology deployment system may generate and deploy multiple different components, each of which may be configured to perform specific functionalities for the machine learning system. For instance, various machine learning components may be dedicated to performing various data acquisition and preparation operations, operations to implement the model and algorithms, model training and evaluation operations, model execution and monitoring operations, etc.

In various examples, the topology deployment system may determine various components and attributes of a machine learning system to be deployed in a production environment, and may generate the network topology for deployment based on the components and/or attributes of the machine learning system. For instance, particular services (e.g., cloud-based services) and/or other computing resources may be used in various combinations to implement the components of the machine learning system. Such services and/or resources may be associated with particular workload resource domains, particular tenants and/or cloud service providers, and/or particular operational configuration or features. Additionally, the attributes of the machine learning system may include any characteristics, configurations, and/or operational data associated with individual machine learning components and/or the machine learning system as a whole. By way of example (and not limitation), attributes of a machine learning system may include the type or amount of input data, the number and type(s) of model used, the machine learning algorithms, the features, the offline and online evaluation (or scoring) metrics of the machine learning system, the performance, scalability, or capacity requirements of the machine learning system, and so on.

Particular machine learning attributes may be associated with particular resources, deployment constraints, and/or metadata, and the topology deployment system may use the associations between the machine learning attributes and the constraints, resources, and/or metadata to determine the network topology for implementing the machine learning system. For instance, the topology deployment system may generate a network topology that is functionally equivalent to the logical model for the machine learning system, while assuring that the network topology also uses the selected resources and complies with the deployment constraints determined based on the components/attributes of the machine learning system. After generating the network topology based at least in part on the components and/or attributes of the machine learning system, the topology deployment system may deploy the network topology across one or a combination of workload resource domains.

Additionally or alternatively, the topology deployment system may be configured to monitor a deployed machine learning system, including monitoring various performance metrics of the system and/or the current status of the system within a machine learning pipeline (or lifecycle). Monitoring the machine learning system may include receiving data from the various services and/or computing resources (or nodes) in the deployed network topology. Based on the monitoring, the topology deployment system may determine model performance levels (e.g., predictive accuracy, model drift or decay, etc.) and/or machine learning system performance levels (e.g., system capacity, request throughput, request rate, latency, etc.). The topology deployment system also may determine current status of the deployed machine learning system as it progresses through a machine learning pipeline (or lifecycle). For instance, the topology deployment system may determine when the machine learning system is actively receiving and processing data, performing feature extraction operations, performing model training, performing model evaluation, executing the trained model to receive requests and provide predictive outputs, etc.

Based on the performance data and/or the current status of the system in the machine learning pipeline, the topology deployment system may determine an updated deployment for the machine learning system. For instance, during a data ingestion and/or model training phase of the machine learning pipeline, the topology deployment system may generate and deploy a first network topology for the machine learning system. Subsequently, when the machine learning system changes to a model execution and/or monitoring phase, the topology deployment system may generate and deploy an updated network topology for the machine learning system. The topology deployment system also may generate and deploy updated network topologies based on changes to the machine learning system, such as changed to machine learning algorithms, model types/structures, features, online/offline evaluation metrics, etc.

The techniques described herein may provide various technical advantages and improvements, including at least improvements in generating network topologies for machine learning system deployments public cloud, private cloud, and/or hybrid cloud environments. By determining and generating an equivalent network topology to implement a machine learning system, that is based on the specific machine learning system attributes, performance, and current status/phase in the machine learning pipeline, the network topology may provide an improved deployment environment that more efficiently uses cloud-based resources in the various components of the machine learning system. These techniques also determine and optimize network topologies that comply with deployment constraints associated with different machine learning attributes, providing improved performance and tuning of machine learning deployments.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout. The techniques described herein may be performed as methods, or by computing devices and/or system having processors and memory units, or may be embodied in non-transitory computer-readable medium storing processor-executable instructions that, when executed by one or more processors, performs the techniques described.

EXAMPLE EMBODIMENTS

As noted above, this disclosure describes techniques for generating and deploying network topologies across one or more multiple workload resource domains, to implement machine learning systems. In various examples, the network topology for a machine learning system may include resource inventories and/or deployment constraints, or may otherwise be based on, the machine learning components and attributes. As used herein, network topologies may refer to distributed computing systems in which a number of different resources (or nodes) are individually designed and/or configured to perform particular functionality, and the various nodes may coordinate and communicate with other nodes to provide the overall functionality of the network topology. The various nodes within a network topology may include, for example, nodes that are specialized and dedicated as network nodes, computing nodes, storage nodes, operating systems, software applications and services, and/or virtual computing machines or instances, etc. Different types and configurations of nodes may include specialized hardware and/or software components to perform the node functionality. Network nodes, for example, may include computing devices such as routers, servers, switches, load balancers, wireless access points, etc., running various software versions and/or having other attributes. Storage nodes may include various types of dedicated storage systems, compute nodes may include physical servers or other dedicated processing devices, and so on. Thus, network topologies may be used to implement enterprise systems and other large-scale computer systems.

In some embodiments, a network topology may be distributed across multiple different workload resource domains. A workload resource domain (which also may be referred to as a resource pool) may refer to any computing environment and/or computing resource container, such as public cloud computing environments, private cloud computing environments, or on-premise datacenters. Network topologies deployed across multiple workload resource domains (which also may be referred to as multi-pool network topologies) may include hybrid network topologies, multi-cloud network topologies, multi-datacenter network topologies, multi-edge network topologies, and any combination thereof in which the topology uses one or more nodes distributed across multiple different workload resource domains. Such multi-pool network topologies may provide potential advantages when designing and deploying large-scale computing systems. For example, certain network topologies may use deployment models in which private clouds and/or on-premise infrastructures are allocated to store and process private and secure data, while one or more public clouds may be used to store or process other non-secure system data. Multi-pool network topologies also may allow for architectural flexibility and scalability with respect to changes in processing demand over time, as well as allowing integration of specialized computational models.

In some examples, a network topology for a machine learning system may be generated based on an underlying logical model representing the machine learning system, along with deployment constraints and/or resource inventory data. The logical (or intent-based) topology model initially may be created and validated, and then used for the physical realization (or deployment) of a network topology that is functionally equivalent to the logical model. During deployment within the multi-pool (e.g., multiple workload resource domain) environment, the network topology model may be optimized for performance and resource usage, and verified for functional equivalence with the logical model. The physical deployment of the network topology model may use internetworking devices and virtual processing resources. Formal methods may be used to validate the correctness of the logical model without the need for test-based verification, and deployment generation instructions may be used automatically generate a physical network topology for the deployment within the multi-pool network topology, including a set of deployment instructions that may be transmitted between gateways in different workload resource domains.

FIG. 1 illustrates a computing environment 100 including a topology deployment system 102, one or more client device(s) 104, and multiple workload resource domains 106. As described in more detail below, the topology deployment system 102 may be configured to generate and deploy network topologies within the computing environment 100, to implement machine learning systems based on logical models of machine learning systems received via the client device(s) 104.

As noted above, multi-pool network topologies may refer to large-scale computing systems and/or solutions that are implemented by several different nodes of various different types (e.g., network nodes, storage nodes, compute nodes, software application or service nodes, virtual machines or instances, etc.), which can be deployed across multiple different workload resource domains, and which can interact and communicate to provide the functionality of the overall topology. Workload resource domains 106 may refer to a dedicated pool of computer resources from which nodes may be allocated. By way of example only, workload resource domain 106A may correspond to a first public cloud computing environment, workload resource domain 106B may correspond to a second public cloud computing environment or to a separate private cloud computing environment, and workload resource domain 106C may correspond to another public or private cloud computing environment or to an on-premise datacenter. Although only three workload resource domains 106 are shown in this example, it is contemplated that a network topology may be deployed across any number of different public clouds, public clouds, private clouds, on-premise datacenters, and/or other resource pools, in various examples.

In various examples, each of the workload resource domains 106 (which also may be referred to as domain infrastructures) of the multi-domain computing environment 100 may generally represent or comprise a resource pool. The resource pool of each workload resource domain 106 may comprise a data center, multiple data centers within the same enterprise, multiple data centers across enterprises, etc. As a specific example, a campus network of a school may be a type of workload resource domain 106A that is connected to a data center running in another workload resource domain 106B by a connection through one or more networks, such as the Internet. Both of the workload resource domains 106A and 106B may further be connected to a public cloud provider 106C as a third domain infrastructure. This is one example of the types of workload resource domain 106 that may be interconnected to create a multi-domain environment 100. Generally, a workload resource domain 106 may comprise a set of resources that are managed, operated, and/or owned by the same or by different entities. In one specific example, the multi-domain environment 100 may comprise a multi-cloud environment that includes multiple public clouds, multiple private clouds (e.g., enterprise networks), a public cloud in combination with a private cloud/network, etc. However, the multi-domain environment 100 may also be utilized in other technologies. For instance, the multi-domain environment 100 may comprise domains of different devices in an Internet-of-Things (IoT) environments where each domain is a different grouping of IoT devices, and the domains are interconnected to form the multi-domain environment. 100. Generally, the multi-domain environment 100 may comprise groupings of devices in different technology areas and/or different types of devices assigned to multiple domains that are connected to each other. Additionally, although a multi-domain environment 100 is shown in this example, the techniques described herein need not use multi-pool network topologies. For instance, the machine learning systems described herein may be implemented within a single workload resource domain 106 in various examples.

In some examples, the topology deployment system 102 may be coupled directly or indirectly to a multi-pool network (e.g., a multi-cloud network) that may include the Internet, one or more private clouds, public clouds, and/or other resource pools (e.g., on-premise datacenters). The topology deployment system 102 may include components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments.

The different nodes types that may operate within a multi-pool network topology (e.g., network nodes, compute nodes, storage nodes, software application or service nodes, virtual machine instance nodes, etc.) each may correspond to or may be executed on one or more computers. As used herein, a "computer" may refer to one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special purpose computing devices.

In various examples described herein, the topology deployment system 102 may be configured to receive logical models 108 corresponding to machine learning systems, and to generate and deploy network topologies to implement the machine learning systems within the workload resource domain(s) 106 of the computing environment 100. In some examples, the topology deployment system 102 may include one or more of a machine learning system analysis component 110, a model generation component 112, a deployment component 114, and/or a machine learning system monitor 116. As described below in more detail, the machine learning system analysis component 110 may be configured to analyze logical models 108 corresponding to machine learning systems, to determine machine learning components and/or attributes. The model generation component 112 may determine topology models for network topologies, based on various inputs such as a logical (or intent-based) topology input (e.g., logical models 108). As described below, the model generation component 112 may use a combination of input data, such as the resource inventories associated with the workload resource domains 106, resource constraints provided by a user (e.g., system administrator or tenant user), as well as based on the components and/or attributes of the machine learning system determined by the machine learning system analysis component 110, to determine a network topology model to be used to implement the machine learning system. The model generation component 112 may provide the verified topology model to the deployment component 114 for physical deployment within the workload resource domains 106. The deployment component 114 may include various subcomponents configured to verify and optimize a network topology based on the model, and to generate deployment instructions programmed or configured to generate the network topology within the workload resource domain(s) 106. The components of the topology deployment system 102 may be configured to assure that the network topology deployed to the workload resource domain(s) 106 maintains functional equivalence with the logical model 108, and also can provide improvements in resource usage optimization and performance for the deployment.

The machine learning system monitor 116 may receive operational data from the various services and computing resources of the deployed network topology, to determine the performance and/or current status or phase of the machine learning system within a machine learning pipeline or lifecycle. In some examples, the machine learning system monitor 116 may provide the performance and/or status/phase data to the model generation component 112 which may determine an updated network topology model based on the data. Particular machine learning components, attributes, performance data, and/or operational status/phase data of the machine learning system may be associated with particular deployment constraints, computing resource requirements, and/or metadata such as service level agreements (SLAs). The model generation component 112 may, based on the analysis and/or monitoring of the machine learning system, determine and use the associated resource requirements, deployment constraints, and/or metadata, to determine the network topology model for implementing the machine learning system.

Although not shown in FIG. 1 so as not to obscure the elements depicted therein, the computing environment 100 (which also may be referred to as a multi-pool network or environment) may include any combination of data communication networks through which the topology deployment system 102, client device(s) 104, and/or workload resource domain(s) 106 may communicate. The communication networks may include local area networks, wide area networks, internetworks or internets, using any of wireline or wireless links, including terrestrial or satellite links. The networks may be implemented by any medium or mechanism that provides for the exchange of data between the various elements of FIG. 1. The various elements of FIG. 1 may also have direct (wired or wireless) communications links. The workload resource domains 106 (e.g., private cloud network(s), public cloud network(s), on-premise datacenter(s), etc.), topology deployment system 102, and other elements of the computing environment 100 each can include a compatible interface and can be programmed or configured to use standardized protocols for communication across the networks, such as TCP/IP, Bluetooth, and higher-layer protocols such as HTTP, TLS, and the like.

Each workload resource domain 106 may be implemented using a server-class computer or other computers having one or more processor cores, co-processors, or other computers. Workload resource domains 106 may include physical server computers and/or a virtual server instances stored in a datacenter, such as through cloud computing. Additionally or alternatively, workload resource domains 106 such as public and/or private cloud networks, may comprise one or more applications executing on a server computer system which comprises instructions for application modeling and appliance/hardware mapping. Workload resource domains 106 may further comprise one or more network policies using notions such as templates or profiles that can be applied to different points in the computing environment 100.

In some embodiments, the topology deployment system 102 may be distributed across one or more of the workload resource domains 106, which may be bridged by a cloud service configured to integrate and virtualize various hierarchical layers of different public or private cloud networks, on-premise datacenters, etc. The individual workload resource domains 106 may comprise respective gateways (e.g., cloud gateways) that may translate cloud storage Application Programming Interfaces (APIs) to block-based storage protocols by using standard network protocols which integrate with existing applications within computing environment 100.

To deploy a network topology across multiple workload resource domains 106, the topology deployment system 102 may receive logical model input (e.g., logical model 108) describing a prospective network topology and/or one or more predefined constraints to be placed on the formal/physical model. In some embodiments, the logical model input and/or the constraints may be received from a tenant user or system administrator via a client device 104. The topology deployment system 102 then may generate a network topology (e.g., a formal and/or physical network topology) for deployment in the multi-pool environment, including transmitting different sets of deployment instructions from the deployment component 114 to the respective gateways within the workload resource domains 106. In some embodiments, the formal (or physical) network topology determined within the model generation component 112 may be subjected to formal model checking to determine whether it is functionally equivalent to the logical model input. Upon establishing functional equivalence between the logical model input and the physical topology that was generated, the deployment instructions may be considered verified, and an actual realization of the generated hybrid network topology may be initiated.

In some embodiments, the input received from the client device 104, describing a network topology for generation or modification, may include multiple workload resource domains 106, including at least one public cloud network associated with a public cloud network provider, and at least one private cloud network associated with an enterprise. The enterprise may include programs, service models, and applications which reside in an on-premise datacenter of the enterprise. Such programs, service models, and applications may include software-as-a-service (SaaS) programs, platform-as-a-service (PaaS) programs, infrastructure-as-a-service (IaaS) programs, Load Balancing-as-a-service (LBaaS) programs, application frontends, application backends, application classification programs, firewalls or others.

A partial order reduction model checking also may be used by the model generation component 112 for model verification in some embodiments. In some examples, the constraint inputs received from network tenants, administrators, etc., via client devices 104 may specify one or more deployment constraints (or constraints) upon the realization of the logical topology within individual clouds and/or datacenters of the multi-pool environment. In such cases, the model generation component 112 may optimize the intermediate topology based upon the input constraints, including automatically remapping the intermediate topology to an optimized network topology by moving functional elements (e.g., nodes or groups of nodes) from a first workload resource domain (e.g., a public cloud) in the intermediate topology, into a different workload resource domain (e.g., a private cloud or on-premise datacenter) in the final formal network topology. In some cases, constraint inputs may specify one or more attributes of a public or private cloud infrastructure.

Although the computing environment 100 may be considered a single computer network, as may each individual workload resource domain 106 within the computing environment 100. As noted above, each of the networks may include a number of network devices configured for intra- and internetwork communications. Such network devices may include any type of networking device, such as servers, switches, routers, hubs, bridges, gateways, modems, repeaters, access points, etc. Additionally, these network devices may include personal, user devices such as phones, tablets, wearables devices, or other personal computing devices. The network devices may comprise physical nodes (e.g., processors, chipsets, devices, etc.), virtual nodes (virtual machines, containers, etc.), and/or any combination thereof.

Individual workload resource domains 106 may, in some cases, correspond to datacenters operating in one or more physical locations. Such datacenters (or other physical locations) may be physical facilities or buildings located across geographic areas that designated to store networked devices that are part of the corresponding workload resource domain 106. These data centers also may include various networking devices, as well as redundant or backup components and infrastructure for power supply, data communications connections, environmental controls, and various security devices. In some examples, a workload resource domain 106 may include one or more virtual data centers which are a pool or collection of cloud infrastructure resources specifically designed for enterprise needs, and/or for cloud-based service provider needs. Generally, the workload resource domains 106 (physical and/or virtual) may provide basic resources such as processor (CPU), memory (RAM), storage (disk), and networking (bandwidth). However, in some examples the network devices of the workload resource 106220 might not be located in explicitly defined datacenters, but may operate from other physical locations.

The client devices 104 through which the topology deployment system 102 may be controlled, may comprise any type of computing device through which a user is able to interact with other devices (e.g., phones, tablets, personal computing devices, wearable devices, network devices, etc.). In some examples, users of the client devices 104 may have registered accounts with the topology deployment system 102 in order to generate and modify network topology models for machine learning systems, and deploy network topologies within the workload resource domains 106. For instance, a topology logical design tool, constraint input tool, and/or optimization or recommendation tools can be provided by the topology deployment system 102 to authorized users at client devices 104 via a client portal (e.g., command line interface (CLI), application programming interface (API), web-based portal, etc.) and/or user interfaces. The client devices 104 may communicate with the topology deployment system 102 (and/or any other devices in the computing environment 100) over one or more networks, including any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

As described herein, the topology deployment system 102 may include one or more computing devices (e.g., a single device, multiple devices, network(s) of devices, etc.) comprising one or more processors configured to execute various computer-executable instructions. Additionally, topology deployment system 102 may include components, modules, etc., that are stored on non-transitory computer-readable media and configured to perform the techniques and operations described herein as being performed by the topology deployment system 102.

Figure 2:
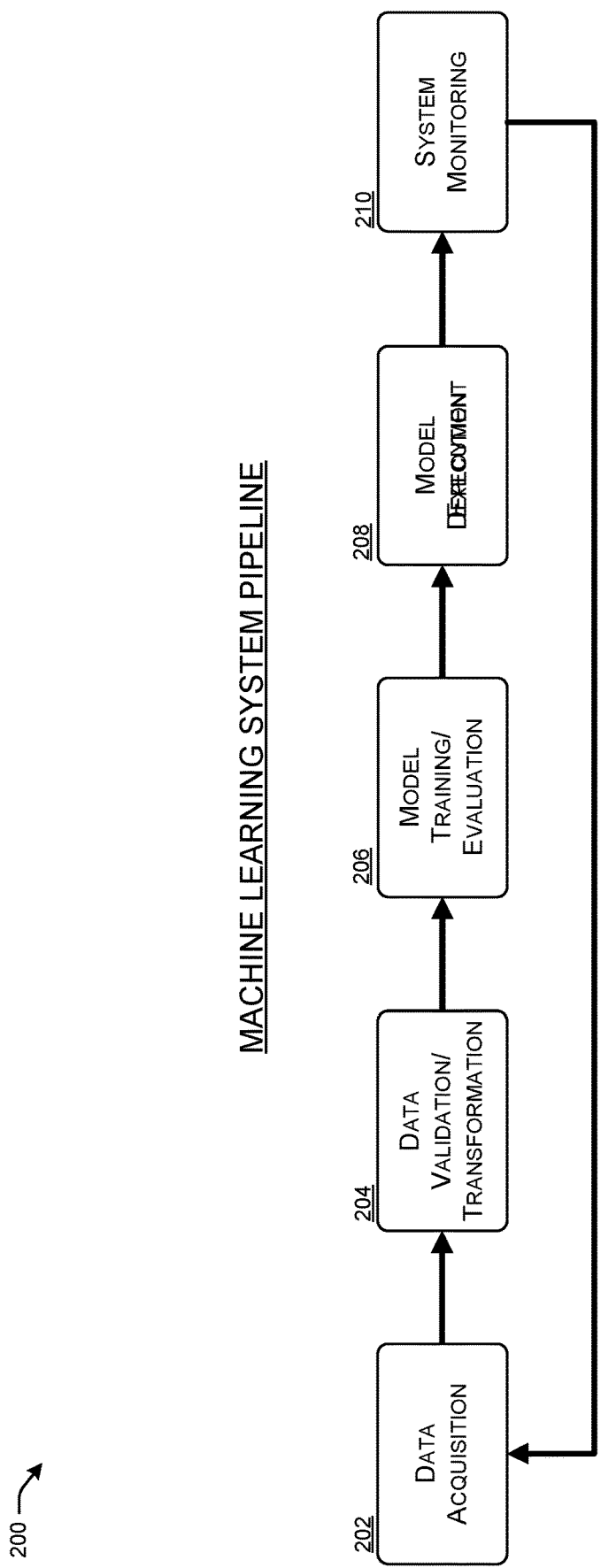
FIG. 2 depicts an example machine learning pipeline including machine learning components, in accordance with one or more implementations of the disclosure.

FIG. 2 shows an example machine learning pipeline 200, including various machine learning components that may be implemented within a computing environment and may work in conjunction to provide the features and functionality of the machine learning system. In this example, the machine learning pipeline 200 includes a data acquisition component 202, a data validation/transformation component 204, a model training/evaluation component 206, a model execution component 208, and a system monitoring component 210. It can be understood from the context of these disclosure that the components 202-210, described below in more detail, are illustrative examples and are not limiting. In other examples, machine learning systems may implement more or less components in various different combinations. Additionally, each of the components 202-210 described herein may include multiple different subcomponents configured to perform specific functionality for the machine learning pipeline 200.

As this example illustrates, a machine learning system may operate as a lifecycle, in which a cyclical process is followed iteratively so that the data collection, modeling, and evaluation operations are continuously performed and improved. The data acquisition component 202 may be implemented via services/resources configured to receive data from one or more data sources to be used in model development, training, and evaluation. Machine learning system attributes associated with the data acquisition component 202 may include the specific data source and/or characteristics of the data source (e.g., on-premises, cloud database, or files), the modalities through which data is received (e.g., streaming versus batch data, frequency of data received, etc.), and the types of data received (e.g., numerical data, categorical data, time-series data, text data, etc.).

The data validation/transformation component 204 may be implemented via services/resources configured to perform various operations for data analysis, exploration, transformation and/or cleaning, based on the data received by the data acquisition component 202. The operations performed by the data validation/transformation component 204 may include various data processing, preparation, and/or validation operations. For example, the data validation/transformation component 204 may determine descriptive statistics based on the received data, for the data as a whole and/or consecutive spans or batches of data to determine how the input data has changed over time. The data validation/transformation component 204 also may be configured to detect and remove anomalies in the data, determine if portions of the data match validated schema, and may detect data drift between spans/batches of data received at different times. Within the data validation/transformation component 204, one or more data transformation subcomponents implemented via services/resources may prepare the data for the model training, including data filtering, data transformations, feature generation and/or extraction. The data validation/transformation component 204 also may generate transformation artifacts, including metadata that may be used in model training for feature normalization, categorical variable encoding, etc. Machine learning system attributes associated with the data validation/transformation component 204 may include the types of features determined, the types of metadata generated, and/or the various types of operations performed to analyze, clean, validate, and/or transform the data.

The model training/evaluation component 206 may be implemented via services/resources configured to perform various operations for training and optimizing one or more models for the machine learning system. Model training may be a time-consuming and resource-intensive task in some cases, requiring significant storage and compute resources from the workload resource domain(s) 106. In some examples, the model training/evaluation component 206 may support parallelism, may handle out-of-memory data, and/or may support hyperparameter tuning. In some cases, the model training/evaluation component 206 may include model analysis and/or evaluation subcomponents. Model analysis/evaluation subcomponents may perform operations to analysis the training results and validate the quality of trained model. The model training/evaluation component 206 may apply model quality criteria such as performance improvements compared to previously deployed models, and/or minimum performance thresholds (e.g., predictive quality) on a subsets of model evaluation data. Machine learning system attributes associated with the model training/evaluation component 206 may include the offline criteria used to evaluate the model, the characteristics of the evaluation data, the features and/or operations of the model training/evaluation component 206, etc.

The model execution component 208 may be implemented via services/resources configured to receive requests from applications, execute the model to produce an output (e.g., a predictive output), and provide responses to the applications. As noted above, the model training/evaluation component 206 may be implemented in order to optimize data scalability and support model complexity. In contrast, in some examples the model execution component 208 may be implemented in minimizing latency and maximizing throughput of responses provided to requesting applications. In some cases, the model execution component 208 may be highly efficient to support multiple simultaneous instances, as well as horizontal scaling, and robustness with respect to failures. The model execution component 208 also may be configured to receive and incorporate updated versions of the model(s) without delays or substantial overhead. Machine learning system attributes associated with the model execution component 208 may include the online criteria used to evaluate the model, the characteristics of the types of requests supported from various applications/services, and/or the various features and subcomponents of the model execution component 208.

The system monitoring component 210 may include one or more services/resources configured to monitor the performance of the deployed machine learning models over time, and to detect decay or degradation based on changes in data profiles. The services/resources of the system monitoring component 210 may track summary statistics of the data and monitor the online performance of the model(s). The system monitoring component 210 also may create logs, provide notifications, initiate model roll backs (e.g., when updated versions of the models degrade performance unexpectedly) and/or may invoke new iterations of the components/processes of the machine learning pipeline 200. In some case, the system monitoring component 210 also may control the automation of the components of the machine learning pipeline 200 to control the different phases of the machine learning lifecycle. For instance, the system monitoring component 210 may include pipeline orchestration subcomponents that connect and coordinate between the various other components 202-208 of the machine learning pipeline 200. The pipeline orchestration operations of the system monitoring component 210 may assure that the machine learning pipeline 200 is executed in sequence, and automatically progresses from one component to the next based on predetermined conditions (e.g., data acquisition, data preparation, model training, model execution, model performance evaluation, etc.). Machine learning system attributes associated with the system monitoring component 210 may include the particular performance metrics and for the model(s), model evaluation criteria, pipeline automation components and criteria, pipeline velocity and frequency of iterations, etc.

Each of the components 202-210 of the machine learning pipeline in this example may include multiple different subcomponents which may be implemented via one or more combination of services and/or computing resources when deployed within the workload resource domain(s) 106. The components 202-210 described herein are illustrative only, and in other examples may be separated and/or combined with other components, and may be executed in different orders.

As described above, in some examples the topology deployment system 102 may generate a deploy a network topology on a single workload resource domain 106 to implement a machine learning system. In other examples, the topology deployment system 102 may deploy a machine learning system across multiple different workload resource domains 106. For instance, as shown in FIG. 1, the logical model 108 may represent the various components and/or subcomponents of a machine learning pipeline 200. The topology deployment system 102 may deploy the machine learning pipeline 200 such that one set of components (e.g., the data acquisition component(s) 202) are deployed on a first workload resource domain 106A, a second set components (e.g., the model training component(s) 206) are deployed on a second workload resource domain 106B, and so on. However, in other examples, the topology deployment system 102 may distribute the components of a machine learning system (e.g., machine learning pipeline 200) across multiple workload resource domains 106 in a while that does not correspond to the different machine learning components. For instance, some of the subcomponents/services within one or more of the component(s) 202-210 may be deployed in a first workload resource domain 106A, while additional subcomponents/services within the same component(s) 202-210 may be deployed in a second workload resource domain 106B, and so on.

Figure 3:
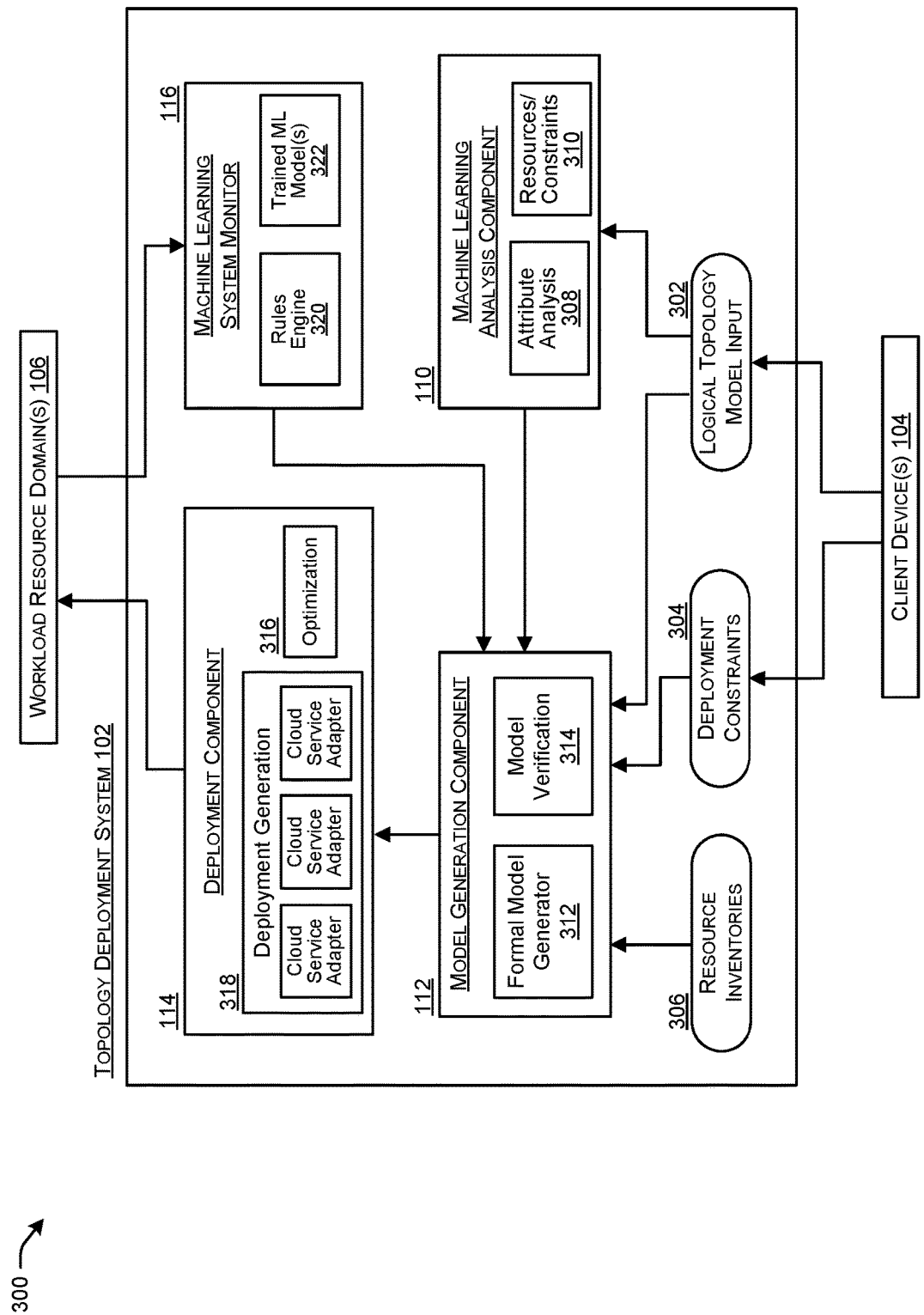
FIG. 3 depicts a system diagram of an example topology deployment system configured to generate and deploy network topologies to implement machine learning systems, within workload resource domains, in accordance with one or more implementations of the disclosure.

FIG. 3 depicts a system diagram of an example topology deployment system configured to generate a network topology model based on a logical model for a machine learning system, verify the compliance of the network topology models with various resources and/or deployment constraints associated with the components and/or attributes of the machine learning system, and deploy a network topology based on the network topology model in a multi-pool environment. The computing environment 300 in this example may be similar or identical the computing environment 100 discussed above in reference to FIG. 1. Computing environment 300 may include a topology deployment system 102, one or more workload resource domains 106 (e.g., public clouds, private clouds, on-premise datacenters, and/or other resource pools), and client device(s) 104 through which authorized users (e.g., tenants, administrators, etc.) may provide inputs to and may interact with the tools and features of the topology deployment system 102. Thus, FIG. 3 may illustrate certain embodiments of the computing environment 100 described in FIG. 1, including certain features and techniques performed by the machine learning system analysis component 110, the model generation component 112, the deployment component 114, and the machine learning system monitor 116.

The machine learning system analysis component 110 may be configured to receive data representing a logical topology model 302 for a machine learning system from the client device(s) 104, and analyze the input of the logical topology model 302 to determine various components and/or attributes of the machine learning system. In some examples, the logical topology model 302 may be similar or identical to the logical model(s) 108 described above. The machine learning system analysis component 110 may analyze the nodes of the logical topology model 302, which may include specialized data storage nodes, software application nodes, network nodes, compute nodes, etc., as well as the various communication links and configurations of the nodes, to determine the components and attributes of the machine learning system to be implemented based on the logical topology model 302. For instance, the attribute analysis component 308 may analyze the logical topology model 302 to determine that the machine learning system includes any one or combination of the machine learning components, subcomponents, services, and/or attributes described above in reference to the machine learning pipeline 200, and/or any other machine learning components or attributes. Based on the machine learning components and/or attributes associated with the logical topology model 302, the attribute analysis component 308 may determine various resources, deployment constraints, and/or other restrictions to be applied to the deployed machine learning system. The resources/constraints component 310 may retrieve or determine associations between any of the particular machine learning components or attributes described herein (or any combination thereof), with particular resources in the workload resource domain(s) 106, particular deployment constraints, and/or particular metadata. The associated resources, constraints, and/or metadata may be provided to the model generation component 112, which can verify that the network topology model complies with the associated resources, constraints, and/or metadata.

The model generation component 112 may be configured to receive input data and determine network topology models for deployment across workload resource domain(s) 106. When initially determining a network topology model (also referred to as a physical model or formal model) to be deployed, the model generation component 112 may use the logical model 302 initially provided for the machine learning system, one or more constraint inputs, and resource inventory data for the workload resource domains 106. Within the model generation component 112, a formal model generator 312 may be configured to determine a formal model (e.g., a physical network topology for the deployment network topology within one or more workload resource domains 106). The formal model generator 312 may determine the formal model based on the logical topology model 302 (e.g., defining the components, features, and configuration of the machine learning system), the deployment constraints 304, and the resource inventories 306 for the workload resource domains 106.

Constraints 304 (also referred to as deployment constraints) may be predefined deployment conditions, specifications, or limitations that are provided by an administrator user and/or may be based on predefined policies of the network topology. Constraints may be associated with any node or groups of nodes within the deployed network topology, or with the network topology as a whole. Examples of constraints 304 may include requirements for specific nodes to be deployed on specific workload resource domains 106, requirements for groups of nodes to be deployed together on the same workload resource domain 106, requirements for minimum or maximum amounts of compute resources, storage resources, and/or network bandwidth to be provided to nodes or groups of nodes, etc. Additional examples of constraints 304 may include a specified number of virtual machine instances to be instantiated, specific types of software products or software configurations, and/or limits on pricing or cost or minimum amounts of storage, and the like. Still other examples of constraints 304 may include requirements as to the placement of network functions within a workload resource domain 106, sensitivity level of data in a workload resource domain 106, capacity expectation of workload resource domain 106, and data traffic expectations. Additional examples of constraints 304 may include affinity or anti-affinity rules. Other constraints 304 may correspond to security-related constraints, such as requirements for certain applications to have encryption enabled, or authorization to occur between services, or encryption between interconnections of workload resource domains. Additional constraint 304 may correspond to placement of services requirements, which may be based on regulation, SLAs, service cost criteria, etc. Certain constraints 304 also may determine a set of tenants, services, and/or domains that are permitted for interaction with other tenants, services, and/or domains.

As noted above, the constraints 304 may be associated with the request from a client device 104 to generate and deploy a network topology to implement a machine learning system. However, any combination of similar or identical deployment constraints may be determined by the machine learning system analysis component 110, based on the components and/or attributes of the machine learning system to be implemented. In various examples, the model generation component 112 may combine the deployment constraints 304 received from the client device 104 with the deployment constraints received from the resources/constraints component 310 based on the analysis of the machine learning system, and may assure that the network topology used to implement the machine learning system complies with the combined sets of constraints.

The model generation component 112 also may receive resource inventory data 306 that defines the available resources within each of the workload resource domains 106. The resource inventory data 306 may determine the limits for the potential network topologies spanning the workload resource domains 106 (e.g., multi-cloud deployments, hybrid network deployments, etc.). The particular resource inventory data 306, including which components collect the resource inventories and provide the data to the topology deployment system 102 may vary in different embodiments. In some instances, resource inventory data 306 may include data specifying which workload resource domains 106 are currently available, the specific resources that are available within each workload resource domain 106, such as the types of network devices and capabilities, the types of storage devices, the processing units, software services, and/or the types of virtual machine images that are available.

Deployment constraints 304 and/or resource inventory data 306 may be provided by a user (e.g., tenant, service provider, or administrator) via a client device 104, or may be received from other components within the computing environment 300 (e.g., the machine learning system analysis component 110). Additionally or alternatively, constraints 304 and/or resource inventory data 306 may be obtained programmatically from files or configuration data that has been stored within the elements of computing environment 300. For example, network management systems within workload resource domains 106 may store or expose network element inventory data or constraints to API calls, parameterized URLs or other programmatic calls, and the topology deployment system 102 may issue such calls to the machine learning system analysis component 110 and/or workload resource domains 106 to obtain responses, objects or download files that contain deployment constraints and/or resource inventory data. In various examples, the model generation component 112 may use one or both of deployment constraints and resource inventory data as inputs, to generate an optimized realization of the network services and other available resources. Constraints and resource inventories may change dynamically based on workload, system/software upgrades, and other factors that may change during the operation of the deployed network topology.

After determining a potential network topology model for the deployment, based on the logical topology model 302, constraints 304, and/or resource inventory data 306, the model generation component 112 may validate and/or optimize the model using the model verification component 314. The model verification component 314 may verify the functional equivalency of the network topology model to the logical topology model 302. The validated network topology model then may be provided to the deployment component 114, which may use an optimization system 316 and deployment generation system 318 to physically deploy the network topology based on the model, by transmitting sets of deployment instructions to gateways within the workload resource domains 106 to implement the network topology based on the network topology model. In some embodiments, one or more cloud service adaptors may be used to generate specific configuration instructions for the resources in the various workload resource domains 106 (e.g., private clouds, public clouds, and/or on-premise enterprise networks of which the topology deployment system 102 may be a part). The cloud service adaptors may comprise executable code that causes generation of topologies specific to different technologies or services that are available only in specific different workload resource domains 106. Non-limiting examples of cloud service providers that may provide at least a portion of the cloud infrastructure of the workload resource domains 106 in which network topologies may be deployed include Amazon Web Services®, Microsoft Azure®, Google Cloud Platform®, and any other public cloud infrastructure.

The specific configuration instructions generated by the cloud service adaptors may be provided as input to optimization system 316, which in some embodiments also may receive constraints 304 and/or resource inventories 306 as input. In such cases, the configuration instructions may be processed based on the constraints 304 and/or resource inventories 306 to remap the network topology to an optimized version that attempts to comply with all constraints (or as many constraints as possible) of the constraints 304. The resulting topology may be verified for functional equivalence with the input model represented in logical topology model 302. In certain embodiments, model verification instructions may be programmed to implement partial order reduction techniques for verification.

In some examples, after initially generating and deploying a network topology, the topology deployment system 102 may receive, via the machine learning system monitor 116, performance and/or operational data associated with the deployed topology. As noted above, the deployed topology may correspond to a machine learning system implemented in one or across multiple of the workload resource domains 106. The machine learning system monitor 116 may receive feedback data from the deployed topology, in the form of operational data received from the nodes and/or other devices systems within the workload resource domains 106 on which the machine learning system is executing. In some embodiments, operational data may be transmitted directly from the individual nodes of the topology (e.g., network nodes, compute nodes, storage nodes, containers, software applications or services, virtual machine instances, etc.). Additionally or alternatively, operational data of the topology may be collected indirectly and transmitted by monitoring devices or systems of the workload resource domains 106 (e.g., network monitors, performance monitors, administrative systems, etc.). The operational data may be transmitted through the gateways and/or other edge computing devices of the workload resource domains 106, to the machine learning system monitor 116, either on a periodic basis (e.g., every second, every 10 seconds, every minute, every hour, etc.) or when triggered by specific events (e.g., performance thresholds, software or system errors, a predetermined number of requests/responses, etc.), and may be different for different sources of the operational data.

In some examples, the machine learning system monitor 116 may receive data from the various services and/or computing resources (or nodes) in the deployed network topology, and may use a rules engine 320 and/or one or more trained machine learning models 322 to analyze and determine the performance levels of the model(s) executing in the workload resource domains 106. Such performance metrics may include predictive accuracy of the model(s), model drift, and/or decay, as well as the request/response capacity, throughput, error rate, latency of the deployed machine learning system. Additionally or alternatively, the machine learning system monitor 116 may be configured to determine a current status (or phase) of the deployed machine learning system within the machine learning pipeline (or lifecycle). For instance, the rules engine 320 and/or one or more trained machine learning models 322 may use the operational data received from the deployed network topology to determine or predict if the deployed machine learning system is currently acquiring data, transforming data, extracting features, performing model training, performing model evaluation, etc. In some cases, the current status and/or phase of the deployed machine learning system may be determined based on the current operational data of the various nodes associated with each phase (e.g., compute usage, storage usage, network usage, etc.). As an example, when the topology nodes dedicated to the model training component have high levels of resource consumption (e.g., meeting or exceeding a compute threshold, storage threshold, network usage threshold, etc.), the machine learning system monitor 116 may infer that the machine learning system is currently in a model training phase. Similarly, if the topology nodes dedicated to transforming data and/or extracting features are have high levels of resource consumption, the machine learning system monitor 116 may infer that the machine learning system is currently in a data validation/transformation phase, etc. In contrast, if the topology nodes dedicated to performing particular tasks/operations in the machine learning have low levels of resource consumption, the machine learning system monitor 116 may infer that the machine learning system is not currently in the machine learning phase associated with those nodes. In some examples, the machine learning system monitor 116 also may receive explicit data from the deployed machine learning system (e.g., system monitoring component 210) indicating the current statuses and/or current machine learning phases of the deployed system, which may be used in addition to or instead of inferring the current status/phases based on resource usage data.

The operational data received by the machine learning system monitor 116 may correspond to data collected after an initial deployment of the machine learning system within the workload resource domains 106, and during time periods concurrent with the execution/operation of the various nodes of the topology, so that the operational data may provide practical status and system feedback data and may take into account dynamic updates occurring at the nodes or elsewhere within the workload resource domains 106. The specific types of operational data, and frequencies at which the data is transmitted, may depend on the particular types, functionalities, and configurations of the nodes within the topology. For instance, compute nodes may provide one set of operational data, network nodes may provide a different set of operational data, software services and virtual machine instances may provide still different sets of operational data, and so on. Specific (non-limiting) examples of operational data may include, resource utilization data for nodes within the topology, bandwidth utilization data for network nodes and/or for networks connecting other nodes/ sections of the topology, software updates (including service level agreement changes) made to software applications or services executing within the topology, monetary costs associated with resources provided by external workload resource domains 106 (e.g., public or private clouds) including any changes to the costs/fee structures of the external workload resource domains 106. Additionally, any of these operational data may be specific to individual nodes of the deployed topology, to the individual workload resource domains 106, or to the topology as a whole. In some embodiments, similar or identical operational data may be received from nodes and/or subnetworks that are not included within the deployed network topology, as operational changes within these other nodes or subnetworks may indirectly affect the performance, stability, or scalability of the deployed topology.

Additional examples of the operational data from the deployed topology that may be received by the machine learning system monitor 116 may include tenant (or client) demography data corresponding to the end users of the topology. Such demography data may include, for example, data metrics for the connection types, access networks, network protocols, and client portals/applications used by the tenants for accessing the deployed machine learning system, as well as times, time zones, and geographic locations from which tenants for access the system, the peak usage hours for the deployed system, and the like. Still other examples of the operational data received by the machine learning engine may include the number and type of machine learning system errors and/or support requests received in connection with the execution of the machine learning system, or express feedback (e.g., rankings, optimization suggestions, topology recommendations, etc.) provided by system administers of the workload resource domains 106 and/or of the individual systems operating therein.

As noted above, the machine learning system monitor 116 may access and execute one or more heuristics-based rules within a rules engine 320 and/or one or more trained machine learning models 322 to analyze the performance and operational data from the deployed machine learning system. In various implementations, one or more trained models may be used, corresponding to any or all of machine learning algorithms described herein. The output of the rules engine 320 and/or trained machine learning models 322 may include a current/recent usage levels or current/recent performance levels for any of the individual nodes within the network topology, and/or for groups of nodes or subnetworks associated with particular machine learning system phases. Usage levels may be expressed, for example, on a numeric scale or as "high," "medium," or "low" usage, and performance levels may be expressed, for example, on a numeric scale or as a percentage of an "acceptable" or "optimal" performance level for the node or subnetwork, etc.

Based on the analysis of the deployed machine learning system, the machine learning system monitor 116 also may determine whether the network topology model associated with the deployment should be recomputed into a more efficient deployment, based on the performance of the deployed machine learning system and/or the current status/ phase of the machine learning system. As an example, based on the current status/phase of the machine learning system, as well as projections for upcoming status/phases, the machine learning system monitor 116 may determine deployment modifications to provide more resources and improve performance of the active phases of the machine learning system, while diverting resources and/or saving costs for the dormant phases. Such modifications may include migrating nodes into different workload resource domains 106, allocating additional and/or higher-performing resources to certain critical or active nodes of the current phases, and vice versa for less critical and/or inactive nodes of other phases. The deployment modifications determined by the machine learning system monitor 116 may identify the type of the modification, the nodes affected, the source and destination locations of one or more migrated nodes (if applicable), etc.

After analyzing the performance and/or operations data for the deployed machine learning system, the machine learning system monitor 116 may or may determine that the network topology model should be recomputed to improve performance and/or based on the current status/phase of the machine learning system. When determining that the network topology model should be recomputed, the machine learning system monitor 116 may initiate the recomputation via the model generation component 112 and deployment component 114, using processes similar to those discussed above for the initial generation and deployment of the network topology.

FIG. 4 is an example table 400 storing associations between particular machine learning components and/or attributes, and corresponding resource and constraint data. As shown in this example, each component or attribute of a machine learning system 402 may have one or more different unique attribute values 404. Each different attribute values 404 for a machine learning component or attribute may be associated with one or more computing resources 406 corresponding to resources within one or more workload resource domains 106, deployment constraints 408, and/or metadata 410 (e.g., a service level agreement) that may be stored for each unique value of a machine learning component or attribute. Although table 400 provides one example of a technique for storing computing resources, deployment constraints, and metadata associated with machine learning system components and/or attributes, additional techniques and details of storing and using classification information to identify cloud providers, service identifiers, and tenant identifiers are discussed in U.S. Pat. No. 9,729,406, issued on Aug. 8, 2017, and titled "Cloud Provider, Service, and Tenant Classification in Cloud Computing," which is herein incorporated by reference in its entirety.

Figure 5:
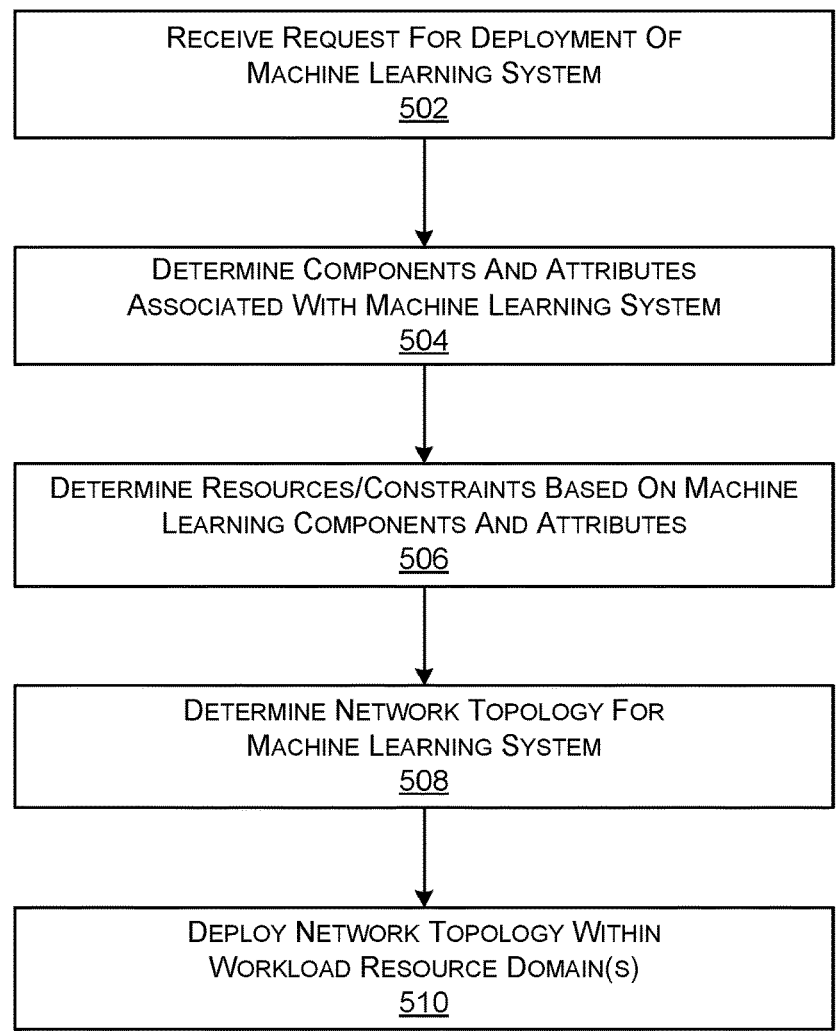
FIG. 5 depicts an example process for generating and deploying a network topology to implement a machine learning system, in accordance with one or more implementations of the disclosure.

FIG. 5 is a flow diagram depicting an example process 500 for generating and deploying a network topology to implement a machine learning system, based on the components and/or attributes of the machine learning system to be deployed. As described above, a machine learning system analysis component 110 may determine one or more deployment resources, specific deployment constraints, and/or other requirements associated with the components and/or attributes of a machine learning system to be deployed, and a model generation component 112 may generate a network topology model that complies with the various constraints and requirements. In some embodiments, process 500 may be performed by various computing devices and systems, such as the topology deployment system 102 in conjunction with one or more client devices 104 and workload resource domains 106 as described herein.

At operation 502, the topology deployment system 102 receives a request to generate and/or deploy a network topology. For example, the model generation component 112 may receive a request from a client device 104, including logical topology model 302 corresponding to a network topology to be deployed. The topology deployment system 102 also may receive one or more deployment constraints 304 and/or resource inventory data 306. As noted above, in some examples the requested network topology may correspond to an implementation of a machine learning system to be to be deployed within one or more workload resource domains 106 corresponding to public and/or private clouds, on-premise data centers, etc.

At operation 504, the machine learning system analysis component 110 may determine one or more components and/or attributes of the machine learning system. In some examples, the machine learning system analysis component 110 may analyze the received logical topology model 302 and deployment constraints 304 to determine the structure and components of the requested system, as well as any combination of the various machine learning system attributes described herein, including but not limited to data input/acquisition attributes, data transformation attributes, feature attributes, model and/or training attributes, machine learning algorithms, performance, scalability, or capacity requirements of the machine learning system, etc.

At operation 506, the machine learning system analysis component 110 may determine one or more resources, constraints, and/or other network topology model requirements or specifications based on the components and/or attributes of the machine learning system determined in operation 504. In some examples, a mapping such as table 400 may be used to determine resources, constraints, and/or metadata (e.g., service level agreements) based on the components and/or attributes of the machine learning system. Additionally or At operation 508, the topology deployment system 102 may determines a set of services and/or resources for the network topology to be deployed. As described above, the model generation component 112 may use a formal model generator 312 to determine a formal model (e.g., a physical network topology for the deployment network topology across multiple workload resource domains 106) that is functionally equivalent to the logical model, using resources (e.g., services) provided by multiple different service providers (e.g., tenants) within the cloud computing environment. The model generation component 112 also may verify that the determined formal model complies with the resource requirements, deployment constraints, and/or other requirements determined in operation 506 based on the attributes of the machine learning system to be deployed.

At operation 510, the topology deployment system 102 may use the deployment component 114 to deploy the network topology based on the formal within the one or more of the workload resource domains 106. The deployment component 114 may perform the physical deployment of the formal model using the techniques described above. In various examples, the deployment performed at operation 510 may be a deployment of a new formal model implementing the machine learning system, or may be a modification of an existing deployed model.

Figure 6:
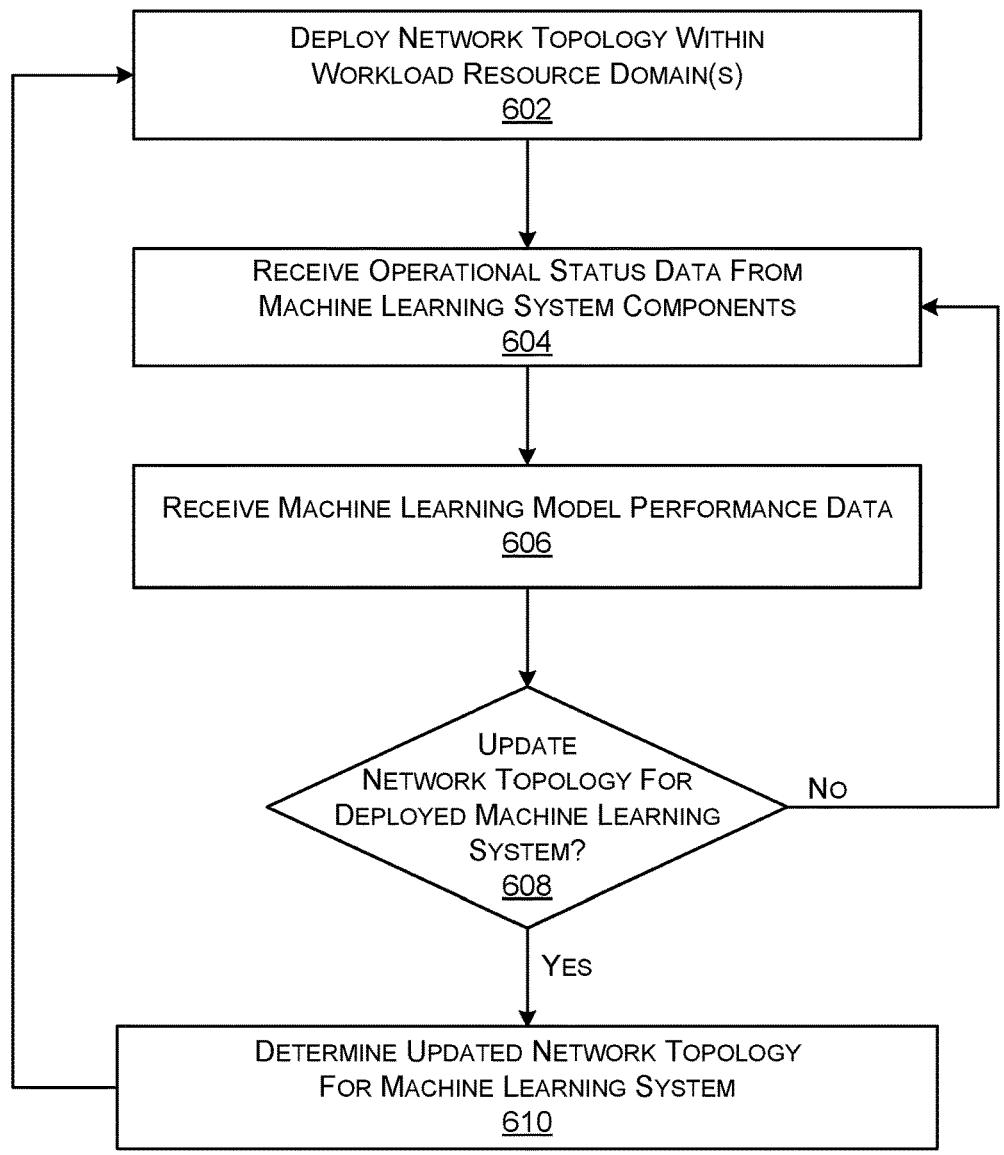
FIG. 6 depicts an example process for monitoring and updating a deployed network topology implementing a machine learning system, in accordance with one or more implementations of the disclosure.

FIG. 6 is another flow diagram depicting an example process 600 for monitoring and updating a deployed network topology that implements a machine learning system, based on performance and/or operational data associated with the machine learning system. As described above, a machine learning system monitor 116 may receive operational data from the various services and computing resources of the deployed network topology, to determine the performance and/or current status or phase of the machine learning system within a machine learning pipeline/lifecycle. Based on the machine learning system performance and/or current status/phase, the topology deployment system may determine an updated network topology based on a recomputed model to provide a more efficient deployment for the machine learning system. In some embodiments, process 600 may be performed by various computing devices and systems, such as the topology deployment system 102 in conjunction with one or more client devices 104 and workload resource domains 106 as described herein.

At operation 602, the topology deployment system 102 may deploy a network topology implementing a machine learning model, within the one or more workload resource domains 106. In some examples, operation 602 may be similar or identical to operation 510, in which a deployment component 114 may perform the physical deployment of the formal model using the various techniques described above.

At operation 604, the topology deployment system 102 may receive operational status data from the nodes of the deployed network topology implementing the machine learning system, and at operation 606 the topology deployment system 102 may receive performance data from the nodes of the deployed network topology implementing the machine learning system. As described above, in some examples the machine learning system monitor 116 may use the operational and/or performance data to determine a current status (or phase) of the deployed machine learning system within the machine learning pipeline (or lifecycle). The machine learning system monitor 116 also may use the operational and/or performance data to determine performance metrics associated with the machine learning system, including but not limited to the predictive accuracy of the model(s), model drift, and/or decay, the request/response capacity, throughput, error rate, latency of the deployed machine learning system. In various examples, operations 604 and 606 may be combined or performed separately, in either order or in parallel.

At operation 608, the topology deployment system 102 may determine whether or not to update the network topology for the deployed machine learning system, based on the operational data and/or performance data received in operations 604 and 606. In some examples, when the machine learning system monitor 116 determines that the performance of the machine learning system has degraded from a previous performance level (608:Yes), then at operation 610 it may determine an updated network topology in operation 610. For instance, when the machine learning system monitor 116 determines that the current performance of the machine learning system (e.g., predictive accuracy of the model, response speed or throughput, latency, request rate, system capacity, etc.) is below one or more performance thresholds, then the machine learning system monitor 116 may provide the performance data to the model generation component 112 to determine an updated formal model.

In other examples, when the machine learning system monitor 116 determines that the current phase of the machine learning system has changed from a previous phase in the lifecycle (608:Yes), then in operation 610 it may determine an updated network topology to provide more resources and improve performance of the current active phases of the machine learning system, while diverting resources and/or saving costs for the dormant phases. For instance, the machine learning system monitor 116 may determine that the current network topology was determined for a first machine learning phase (e.g., a model training phase), and the current machine learning phase has changed to a different phase (e.g., a model execution phase, data acquisition phase, etc.). In this example, the machine learning system monitor 116 may provide the updated machine learning system status/phase information to the model generation component 112, which may generate an updated formal model that shifts resources, reduces costs, and/or optimizes performance of the machine learning model. In some cases, the model generation component 112 may shift nodes/resources away from non-active or dormant components/sub-components of machine learning system to those currently using more resources, and/or those that are predicted to use more resources in subsequent phases. The model generation component 112 also may migrate components to different workload resource domains 106, and/or shift from higher cost and higher performing resources to lower cost and lower performing resources (or vice versa) based on the current status/phase of the machine learning system, or the predicted upcoming statuses/phases.

Figure 7:
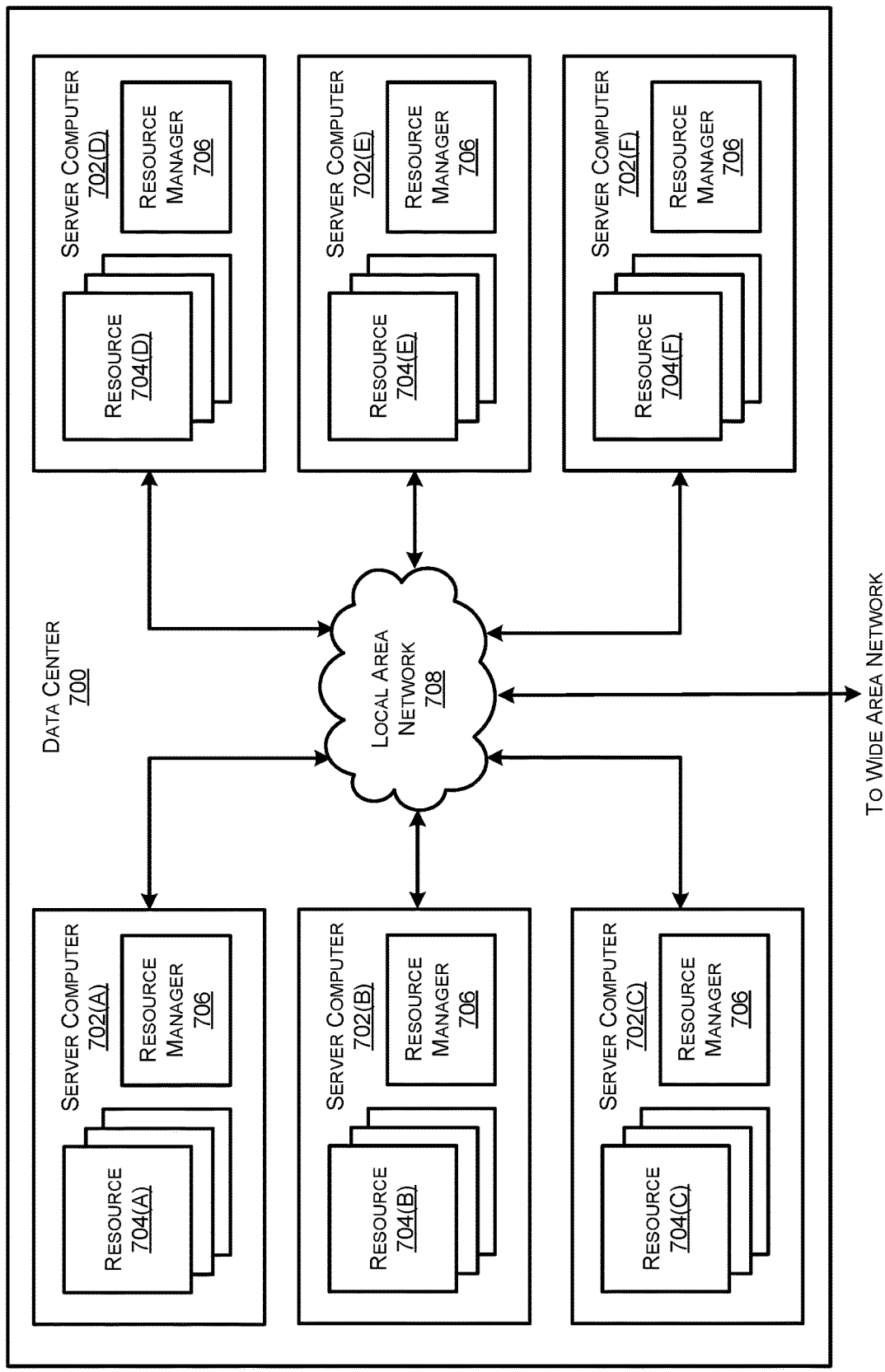
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, any of the computing devices, systems, or components described herein. For examples, a workload resource domain 106 may be implemented using one or more of a data center 700. Additionally or alternatively, a server computer 702 may correspond any or all of the components of the topology deployment system 102 described herein (e.g., the machine learning system analysis 110, the model generation component 112, the deployment component 114, and/or the machine learning system monitor 116), and/or any other computing devices included in the computing environments 100 and/or 300. Although described as server computers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single computer server 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized. In some examples, the server computers 702 may each execute one or more application containers and/or virtual machines to perform techniques described herein.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations.

Figure 8:
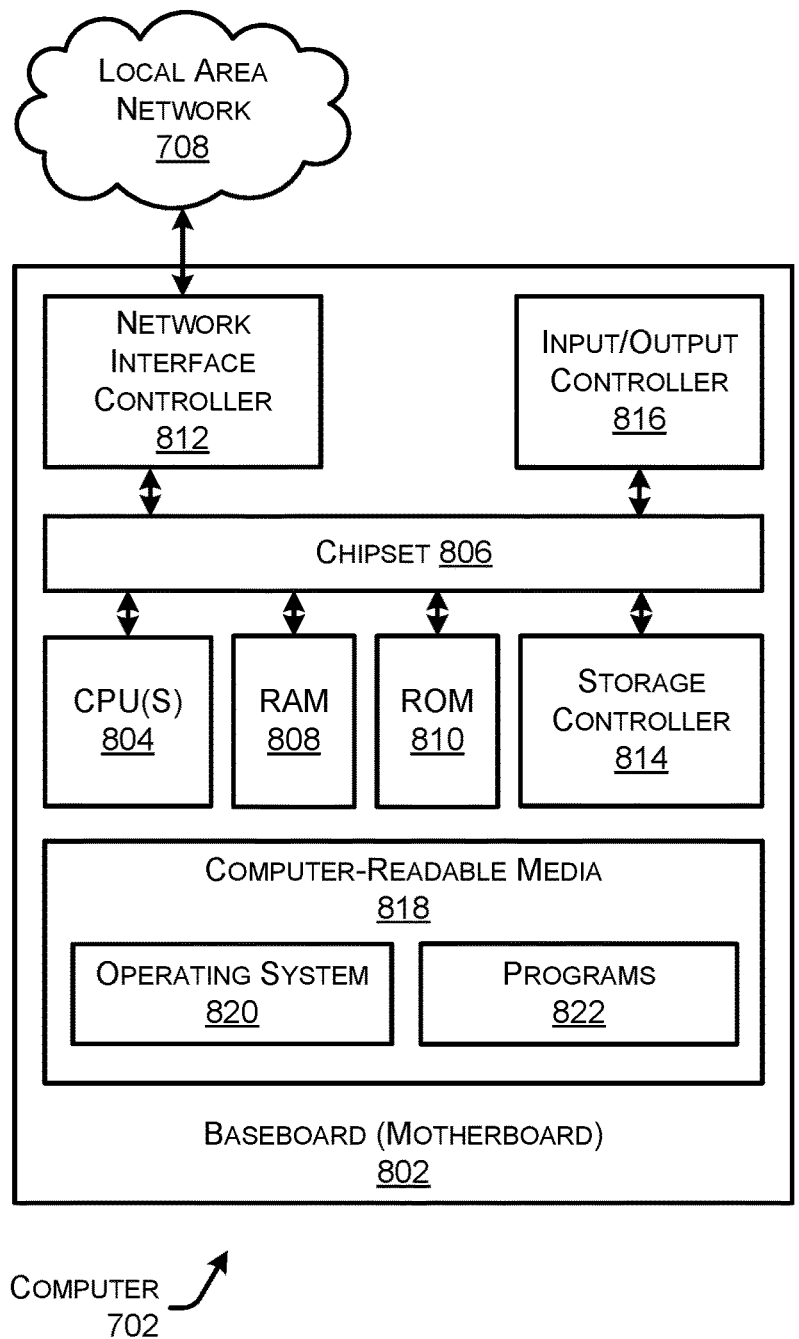
FIG. 8 is a computer architecture diagram showing an illustrative computer hardware architecture for implementing a server device that can be utilized to implement aspects of the various technologies presented herein.

FIG. 8 shows an example computer architecture for a server computer 702 capable of executing program components for implementing the functionality described above. The computer architecture shown in FIG. 8 may correspond to a conventional server computer, workstation, desktop computer, laptop, tablet, network appliance, e-reader, smartphone, or other computing device, and can be utilized to execute any of the software components presented herein. In some examples, a server computer 702 may be used to implement the topology deployment system 102 and/or any of the separate computing devices, systems, or components of the topology deployment system 102 described herein (e.g., the machine learning system analysis 110, the model generation component 112, the deployment component 114, and/or the machine learning system monitor 116), and/or may be used to implement client device(s) 104. Although not shown in this example, the server computer 702 may comprise network devices such as servers, switches, routers, hubs, bridges, gateways, modems, repeaters, access points, etc.

The server computer 702 may correspond to any of the computing devices, systems, or components of the topology deployment system 102 described herein. In some examples, the server computer 702 may be configured to perform, potentially in conjunction with other server computers, some or all of the operations of the topology deployment system 102.

The computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 702 to other computing devices over the network 708. It should be appreciated that multiple NICs 812 can be present in the computer 802, connecting the computer to other types of networks and remote computer systems.

The computer 702 can be connected to a storage device 818 that provides non-volatile storage for the computer. The storage device 818 can store an operating system 820, programs 822, and data, which have been described in greater detail herein. The storage device 818 can be connected to the computer 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 818 by detecting the physical states or characteristics of one or more particular locations within the physical storage units.

In addition to the mass storage device 818 described above, the computer 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 702.

In some examples, the operations performed by the topology deployment system 102 and/or any components included therein, may be supported by one or more devices similar to computer 702. Stated otherwise, some or all of the operations performed by the topology deployment system 102 and or any components included therein, may be performed by one or more computer devices (e.g., computer 702) operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 818 can store other system or application programs and data utilized by the computer 702.

In one embodiment, the storage device 818 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above in reference to FIGS. 1-6. The computer 702 can also include computer-readable storage media having instructions stored thereupon for performing any of the other computer-implemented operations described herein.

The computer 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture different than that shown in FIG. 8.

As described herein, the computer 702 may comprise any of the devices described herein. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by the topology deployment system 102, the client device(s) 104, and/or the workload resource domain(s) 106. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure performed by the topology deployment system 102, the client device(s) 104, and/or the workload resource domain(s) 106. For instance, the programs 822 may cause the computer 702 to perform techniques for generating and deploying network topologies within one or more workload resource domain(s) 106.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:
1. A system comprising:
   one or more processors; and one or more non-transitory computer-readable media storing computer-executable instructions that, when executed by the one or more processors, perform operations comprising:
receiving a logical topology model associated with a machine learning system, wherein the machine learning system includes a first machine learning component and a second machine learning component;
determining a first attribute associated with the first machine learning component of the machine learning system, and determining a second attribute associated with the second machine learning component of the machine learning system, wherein the first attribute and the second attribute include at least one of:
a type of machine learning model;
a machine learning algorithm; or
a scoring metric associated with the machine learning system;
determining a network topology within a computing environment, wherein the network topology is determined based at least in part on the logical topology model, the first attribute associated with the first machine learning component, and the second attribute associated with the second machine learning component,
determining a set of deployment instructions based on the network topology; and
transmitting the set of deployment instructions to one or more nodes within the computing environment.

2. The system of claim 1, wherein determining the network topology includes:
determining a first workload resource domain of the computing environment in which to deploy the first component of the machine learning system; and
determining a second workload resource domain of the computing environment in which to deploy the second component of the machine learning system.

3. The system of claim 1, wherein the first attribute associated with the first component of the machine learning system comprises at least one of:
a type of input data associated with the machine learning system; or
an amount of input data associated with the machine learning system.

4. The system of claim 3, wherein determining the network topology comprises:
determining a first deployment constraint associated with the first component; and
determining a second deployment constraint associated with the second component,
wherein the network topology complies with the first deployment constraint and the second deployment constraint.

5. The system of claim 1, wherein the machine learning system is configured to operate as a processing pipeline, and wherein the first component is associated with a model training component and the second component is associated with a model execution component.

6. The system of claim 5, the operations further comprising:
determining a first operational status of the model training component;
determining a second operational status of the model execution component;
determining an updated network topology, based at least in part on the first operational status and the second operational status; and
modifying a deployment of the network topology within the computing environment, based at least in part on the updated network topology.

7. The system of claim 5, wherein determining the network topology comprises:
determining a first deployment constraint associated with the model training component; and
determining a second deployment constraint associated with the model execution component, wherein the first deployment constraint is different from the second deployment constraint,
wherein the network topology complies with the first deployment constraint and the second deployment constraint.

8. The system of claim 1, the operations further comprising:
determining, for a deployment of the machine learning system executing within the computing environment, a performance level associated with the deployment;
determining an updated network topology, based at least in part on the performance level associated with the deployment; and
modifying the deployment of the machine learning system within the computing environment, based at least in part on the updated network topology.

9. A method comprising:
receiving, by a topology deployment system, a logical topology model associated with a machine learning system, wherein the machine learning system includes a first machine learning component and a second machine learning component;
determining, by the topology deployment system, a first attribute associated with the first machine learning component of the machine learning system, and determining a second attribute associated with the second machine learning component of the machine learning system, wherein the first attribute and the second attribute include at least one of:
a type of machine learning model;
a machine learning algorithm; or
a scoring metric associated with the machine learning system;
determining, by the topology deployment system, a network topology within a computing environment, wherein the network topology is determined based at least in part on the logical topology model, the first attribute associated with the first machine learning component, and the second attribute associated with the second machine learning component;
determining, by the topology deployment system, a set of deployment instructions based on the network topology; and
transmitting, by the topology deployment system, the set of deployment instructions to one or more nodes within the computing environment.

10. The method of claim 9, wherein determining the network topology includes:
determining a first workload resource domain of the computing environment in which to deploy the first component of the machine learning system; and
determining a second workload resource domain of the computing environment in which to deploy a second component of the machine learning system.

11. The method of claim 9, wherein the first attribute associated with the first component of the machine learning system comprises at least one of:
   a performance requirement associated with the machine learning system; or
   a scalability requirement associated with the machine learning system.

12. The method of claim 11, wherein determining the network topology comprises:
   determining a first deployment constraint associated with the first component; and
   determining a second deployment constraint associated with the second component,
   wherein the network topology complies with the first deployment constraint and the second deployment constraint.

13. The method of claim 9, wherein the machine learning system is configured to operate as a processing pipeline, and wherein the first component is associated with a model training component and the second component is associated with a model execution component.

14. The method of claim 13, further comprising:
   determining a first operational status of the model training component;
   determining a second operational status of the model execution component;
   determining an updated network topology, based at least in part on the first operational status and the second operational status; and
   modifying a deployment of the network topology within the computing environment, based at least in part on the updated network topology.

15. The method of claim 13, wherein determining the network topology comprises:
   determining a first deployment constraint associated with the model training component; and
   determining a second deployment constraint associated with the model execution component, wherein the first deployment constraint is different from the second deployment constraint,
   wherein the network topology complies with the first deployment constraint and the second deployment constraint.

16. The method of claim 9, further comprising:
   determining, for a deployment of the machine learning system executing within the computing environment, a performance level associated with the deployment;
   determining an updated network topology, based at least in part on the performance level associated with the deployment; and
   modifying the deployment of the machine learning system within the computing environment, based at least in part on the updated network topology.

17. A non-transitory computer-readable medium storing processor-executable instructions that, when executed by one or more processors, cause the one or more processors to perform operations comprising:
   receiving a logical topology model associated with a machine learning system, wherein the machine learning system includes a first machine learning component and a second machine learning component;
   determining a first attribute associated with the first machine learning component of the machine learning system, and determining a second attribute associated with the second machine learning component of the machine learning system, wherein the first attribute and the second attribute include at least one of:
      a type of machine learning model;
      a machine learning algorithm; or
      a scoring metric associated with the machine learning system;
   determining a network topology within a computing environment, wherein the network topology is determined based at least in part on the logical topology model, the first attribute associated with the first machine learning component, and the second attribute associated with the second machine learning component;
   determining a set of deployment instructions based on the network topology; and
   transmitting the set of deployment instructions to one or more nodes within the computing environment.

18. The non-transitory computer-readable medium of claim 17, wherein the machine learning system is configured to operate as a processing pipeline, and wherein the first component is associated with a model training component and the second component is associated with a model execution component.

19. The non-transitory computer-readable medium of claim 18, the operations further comprising:
   determining a first operational status of the model training component;
   determining a second operational status of the model execution component;
   determining an updated network topology, based at least in part on the first operational status and the second operational status; and
   modifying a deployment of the network topology within the computing environment, based at least in part on the updated network topology.

20. The non-transitory computer-readable medium of claim 18, wherein determining the network topology comprises:
   determining a first deployment constraint associated with the model training component; and
   determining a second deployment constraint associated with the model execution component, wherein the first deployment constraint is different from the second deployment constraint,
   wherein the network topology complies with the first deployment constraint and the second deployment constraint.

* * * * *